(12) United States Patent
Kleppa

(10) Patent No.: US 10,294,763 B2
(45) Date of Patent: May 21, 2019

(54) BELLOWS VALVE AND AN INJECTION VALVE

(71) Applicant: PETROLEUM TECHNOLOGY COMPANY AS, Stavanger (NO)

(72) Inventor: Erling Kleppa, Jørpeland (NO)

(73) Assignee: PETROLEUM TECHNOLOGY COMPANY AS, Stavanger (NO)

( * ) Notice: Subject to any disclaimer, the term of this patent is extended or adjusted under 35 U.S.C. 154(b) by 46 days.

(21) Appl. No.: 15/527,220

(22) PCT Filed: Dec. 10, 2015

(86) PCT No.: PCT/NO2015/050242
§ 371 (c)(1),
(2) Date: May 16, 2017

(87) PCT Pub. No.: WO2016/093706
PCT Pub. Date: Jun. 16, 2016

(65) Prior Publication Data
US 2017/0356277 A1  Dec. 14, 2017

(30) Foreign Application Priority Data
Dec. 11, 2014  (NO) .................................. 20141503

(51) Int. Cl.
*F04F 1/08* (2006.01)
*E21B 43/12* (2006.01)
(Continued)

(52) U.S. Cl.
CPC ............ *E21B 43/123* (2013.01); *E21B 34/10* (2013.01); *F16J 3/06* (2013.01); *F16K 1/126* (2013.01);
(Continued)

(58) Field of Classification Search
CPC ............ F16J 3/06; E21B 43/123; E21B 34/10
(Continued)

(56) References Cited

U.S. PATENT DOCUMENTS 2,542,259 A    2/1951  O'Leary
2,610,644 A    9/1952  Carlisle et al.
(Continued)

FOREIGN PATENT DOCUMENTS

EP           2 708 696 A2    3/2014
WO      WO 2008/150179 A1   12/2008
(Continued)

OTHER PUBLICATIONS

Extended European Search Report, dated Jul. 30, 2018, for European Application No. 15868150.2.
(Continued)

*Primary Examiner* — Umashankar Venkatesan
(74) *Attorney, Agent, or Firm* — Birch, Stewart, Kolasch & Birch, LLP

(57) ABSTRACT

A bellows valve includes a first bellows connected to a first cap member at one end and to a support member at the other end, and a second bellows connected to a second cap member at one end and to said support member at the other end. Respective first and second bellows cavities are thus formed inside each bellows. An orifice is arranged to fluidly interconnect the first and second bellows cavities, and a bellows-internal valve device is arranged to selectively open and close the orifice. The bellows-internal valve device includes first and second resilient members arranged on respective first and second sides of the support member and having respective holding portions being coupled to respective first and second holding members on the valve device. The bellows valve is useful in injection valves, such as gas lift valves.

16 Claims, 4 Drawing Sheets

(51) Int. Cl.
*F16K 41/10* (2006.01)
*F16J 3/06* (2006.01)
*E21B 34/10* (2006.01)
*F16K 1/12* (2006.01)
*F16K 7/02* (2006.01)
*F16K 27/02* (2006.01)
*F16K 31/122* (2006.01)
*F16K 31/126* (2006.01)

(52) U.S. Cl.
CPC ............... *F16K 7/02* (2013.01); *F16K 27/02* (2013.01); *F16K 31/122* (2013.01); *F16K 31/1268* (2013.01); *F16K 41/10* (2013.01)

(58) Field of Classification Search
USPC .............................. 137/508, 510, 155, 484.6
See application file for complete search history.

(56) References Cited

U.S. PATENT DOCUMENTS

| | | | |
|---|---|---|---|
| 2,698,024 A | 12/1954 | Canalizo | |
| 2,797,700 A | 7/1957 | McGowen, Jr. | |
| 3,208,398 A | 9/1965 | Douglas | |
| 3,363,581 A * | 1/1968 | Kelley | E21B 43/123 |
| | | | 137/155 |
| 4,014,386 A * | 3/1977 | Johnson | E21B 34/08 |
| | | | 137/155 |
| 6,827,146 B2 | 12/2004 | Faustinelli | |
| 6,932,581 B2 | 8/2005 | Messick | |
| 7,370,706 B2 | 5/2008 | Becker et al. | |
| 8,701,779 B2 | 4/2014 | Kleppa et al. | |
| 2003/0111231 A1 | 6/2003 | Faustinelli | |
| 2004/0182437 A1 | 9/2004 | Messick | |
| 2011/0067879 A1 | 3/2011 | Kleppa et al. | |
| 2014/0076579 A1 | 3/2014 | Salihbegovic | |
| 2015/0253785 A1* | 9/2015 | Thorne | G05D 16/0616 |
| | | | 137/510 |
| 2015/0253786 A1* | 9/2015 | Reed | F16K 31/126 |
| | | | 137/510 |

FOREIGN PATENT DOCUMENTS

| | | |
|---|---|---|
| WO | WO 2010/062187 A1 | 6/2010 |
| WO | WO 2015/132763 A2 | 9/2015 |

OTHER PUBLICATIONS

International Search Report, issued in PCT/NO2015/050242 (PCT/ISA/210), dated Apr. 15, 2016.

Norwegian Search Report for application No. 20141503 dated Jun. 29, 2015.

PRWeb, "New High Pressure Bellows Seal from Senior Operations, the DELTA P, Capable of Withstanding Extreme System Pressures With High Cycle Life", Sharon, MA, May 21, 2014, Senior Operations LLC Metal Bellows, whole document. www.prweb.com/release/high.pressure/bellows.seal/prweb11869363.htm.

Written Opinion of the International Searching Authority, issued in PCT/NO2015/050242 (PCT/ISA/210), dated Mar. 8, 2016.

* cited by examiner

BELLOWS VALVE AND AN INJECTION VALVE

FIELD OF THE INVENTION

The invention relates to the field of valves, and more particularly to injection valves. More particularly, the invention concerns a bellows valve and an injection valve, as set out by the preambles of claim 1 and claim 12.

BACKGROUND OF THE INVENTION

The use of bellows is well known within the field of mechanical engineering. In that context, bellows are generally elastic vessels that are compressible and expandable when subjected to positive and negative pressures. These bellows are typically made of a suitable metal material and are designed to assume its original shape when the pressures are relieved. Metal bellows are typically made by forming, electroforming or by welding individual metal diaphragms to each other. Welded metal bellows are generally preferred for applications requiring high strength, precision, sensitivity and durability. The materials of welded bellows may be titanium, stainless steel or other high-strength, corrosion resistant, material.

Bellows, and particularly welded metal bellows, find may applications, such as mechanical seals and valves. For example, welded metal bellows are widely used in so-called gas lift valves that are installed in subterranean hydrocarbon wells.

Hydrocarbons, such as oil, gas and/or mixtures thereof, are normally found in subterranean reservoirs. These natural hydrocarbon reservoirs are exploited by drilling one or more boreholes (wells) into the reservoirs and extracting (producing) the hydrocarbons via suitable piping and process equipment. However, there are hydrocarbon reservoirs where the natural flow of hydrocarbons to the surface is not sufficient to allow or maintain profitable production of the well. This may, for example, be due to the viscosity and/or weight of the hydrocarbons, or that the pressure in the oil well is too low to counter the hydrostatic pressure of the fluid in the well as well as the counter-pressure that the processing installations on the surface exert on the fluid in the oil and/or gas well. The hydrocarbon reservoir may also, after being in production for some time, lose the pressure that is necessary to drive the hydrocarbons out of the reservoir.

Therefore, over the years, a number of systems and principles have been developed to increase the production of the well with the aid of artificial lifting. One common artificial lift method involves the use of injected gas. In such so-called gas lift method, a gas is injected at high pressure into the annular space between the casing and the production tubing. Pressure-controlled valves, so-called injection valves or gas lift valves, are used to supply and control the amount of gas that flows into the production tubing. The most common gas lift technique is that of continuous flow, which is very similar to natural flow. In continuous-flow gas lift systems, the gas emanating from the formation is supplemented with additional gas high-pressure, supplied from an external source. This external gas is injected continuously into the annulus and into the production tubing, and mixes with the produced well fluid. This process decreases the fluid density and the flowing pressure gradient of the mixture, and promotes fluid to flow into the wellbore. Gas lift valves may also be used during a start-up phase of a well, where completion fluid is found in both the well annulus and the production tubing. To start production in a well, completion fluid that is in the annulus must first be displaced, through one or more of the gas lift valves, and up to the surface through the production tubing.

The configuration and arrangement of these pressure-controlled valves will depend on a number of parameters. For example, depending on the size (diameter) of the production tubing and the injection pressure available, so-called gas injection points will be provided at one or more locations in and along the production tubing, the specific configuration for each individual well thus being adapted for optimal gas injection. The pressure-operated valve, e.g. a gas lift valve, will then be installed at these gas injection points, at the same or different locations along the longitudinal direction of the production tubing with the purpose of being able to initiate gas injection, such that through this artificial "lifting" an optimal production of the well is obtained.

The gas lift valve(s) may then be operated or controlled according to a number of different principles, for example, by means of pressure, where there are pressure differences around and/or across the valve that effect the control of the valve(s), i.e., the opening and closing of the valve.

The website www.prweb.com/releases/high_pressure/bellows_seal/prweb11869363.htm describes that Sensor Operations LLC Metal Bellows has developed a high pressure bellows seal for use in injection valve applications.

U.S. Pat. No. 6,932,581 B1 (Messick) discloses a gas lift valve usable with a subterranean well, and describes a housing, a valve stem and at least one bellows. The housing has a port that is in communication with a first fluid, and the valve stem is responsive to the first fluid to establish a predefined threshold to open the valve. The bellow(s) form a seal between the valve stem and the housing. The bellow(s) are subject to a force that is exerted by the first fluid; and a second fluid contained in the bellow(s) opposes the force that is exerted by the first fluid. The valve stem is comprised of a gas stem and a fluid stem, and the cross-sectional diameters of the gas and fluid stems are different. The gas stem and fluid stem may be separated parts that are coupled together by pressure during activation, or be manufactured as a single part.

U.S. Pat. No. 3,208,398 A (Douglas) describes a gas lift valve having a pressure chamber, an upper sealed bellows diaphragm suspended below the pressure chamber and being in fluid communication with therewith, and where the pressure chamber and bellows diaphragm are charged at a predetermined pressure above the atmospheric pressure. A valve assembly is attached below the upper bellows diaphragm and includes a sealed chamber, and a lower bellows diaphragm is suspended below the chamber and is in communication therewith. A valve head which is configured to interact with a valve seat is attached to the lower end of the lower bellows diaphragm.

WO 2008/150179 A1 (Tveiten, et al.) describes a valve device comprising an external structure with a longitudinal axis and a valve seat, and a valve body mounted movably inside the external structure. The valve device comprises a first bellows device permitted to be moved in a substantially radial direction, in fluid connection with a first fluid, and hydraulically connected to a second bellows device permitted to be moved in a substantially axial direction. The second bellows device is connected to a first part piston cooperating with a second part piston, thereby giving the second part piston an oppositely directed movement relative to the first part piston, which thereby moves the valve body relative to the valve seat.

U.S. Pat. No. 2,542,259 A (O'Leary) describes a valve having an expandable elastic bellows, cooperating with a valve member. U.S. Pat. No. 2,797,700 A (McGowen), U.S. Pat. No. 2,698,024 A (Canalizo), U.S. Pat. No. 2,610,644 A (Carlisle, et al.) describe flow valves utilizing bellows.

WO 2010/062187 A1 (Tveiten, et al.) describe a valve for use in an offshore or onshore oil and/or gas well for the purpose of increasing the production of the well. The valve comprises an outer structure in which a first and a second pressure-actuated bellows device are arranged, the first and second pressure-actuated bellows device, via a support means, being in fluid communication with each other. The support means is fixedly mounted internally in the outer structure, the support means thereby delimiting an open and a closed space for respectively the first and the second pressure-actuated bellows device, wherein the closed space is filled with a fluid under pressure, whilst the open space is in fluid communication with a surrounding fluid. Internally in the support means a movable piston is provided; the piston being allowed to be moved in the axial direction of the support means. The piston can further be configured such that, together with the through-hole in the top and/or bottom face of the support means, it forms a metal-to-metal seal, whereby when the piston is brought into contact with the top or bottom face of the support means, the first or the second pressure actuated bellows device will not be allowed a further movement in its axial direction.

U.S. Pat. No. 7,370,706 B2 (Becker, et al.) discloses a gas lift valve bellows assembly in which an internal piston incorporated within the bellows provides over travel prevention and over pressure protection during valve operation, independent of the set or operating gas pressures exerted on the gas lift valve. The piston separates a hydraulic damping reservoir in the interior convolutions of the bellows from the upper gas volume chamber. The piston travels a pre-set distance between two stops to provide a fluid dampened hydraulic balance across the bellows convolutions in both the open and closed positions of the valve.

U.S. Pat. No. 6,827,146 B2 (Faustinelli) discloses a double bellows gas lift valve to be seated in a gas lift pocket mandrel in an oil well. The valve comprises a casing with an adjustable choke installed in said oil well; a tubing within said casing, wherein a liquid slug may move from an oil reservoir to a surface of said oil well; an upper bellow having a stem operatively engaging a first seat and the upper bellow having a first pressure; and a lower bellow having a perforated lower stem operatively engaging a second seat and the lower bellow having a second pressure which is different than the first pressure of the upper bellow.

U.S. Pat. No. 8,701,779 B2 (Kleppa, et al.) discloses a valve device which is employed in connection with oil and gas wells with the object of increasing the well's production. The valve device comprises an external housing, where at least one inlet in the external housing is connected to an outlet through a longitudinal bore in the housing longitudinal direction. Between the valve device inlet and outlet a valve seat is mounted in the bore, where a valve body shuts off the connection between the inlet and the outlet. The valve body position is controlled by a support which is connected with a pressure-sensitive bellows device, comprising an upper and a lower bellows element. At a given external pressure, the lower bellows element in the bellows device will be compressed in the valve device axial direction, whereby this compression causes the two bellows elements' impact elements to be moved relative to each other, thereby causing the valve body to be lifted out of abutment with the valve.

SUMMARY OF THE INVENTION

The invention is set forth and characterized in the main claim, while the dependent claims describe other characteristics of the invention.

It is thus provided a bellows valve, characterized by:
a first bellows connected to a first cap member at one end and to a support member at the other end; and
a second bellows connected to a second cap member at one end and to said support member at the other end; thereby forming respective first and second bellows cavities inside each bellows; and
an orifice arranged to fluidly interconnect the first and second bellows cavities; and
a bellows-internal valve device arranged to selectively open and close the orifice.

In one embodiment, the first bellows is connected to a first side of the support member, and the second bellows is connected to a second side of the support member. The support member is preferably configured for connection to an internal portion of a valve housing. In one embodiment, the orifice is formed in the support member.

The bellows-internal valve device comprises in one embodiment first and second valve sealing elements arranged to selectively mate with respective first and second valve seats to close the orifice. In one embodiment, the valve sealing elements are interconnected via a connecting member. In one embodiment, the connecting member extends through the orifice.

The bellows-internal valve device comprises in one embodiment first and second resilient members arranged on respective first and second sides of the support member and having respective portions being coupled to respective first and second holding members on the valve device. The resilient elements may be coil springs.

In one embodiment, the first cap member is disc-shaped and configured for connection to a valve stem. The first and second cap members may each comprise a circumferential gasket means.

The invented bellows valve is robust and reliable, due to its novel bellow-internal valve device and is conveniently usable in combination with an injection valve having
a housing with an inlet port and an outlet port for fluid flow;
a base member arranged in the housing between the inlet port and the outlet port, and having a through-going conduit;
a valve member configured to move in the housing and comprising a sealing element configured to releasably mate with a valve seat, to prevent fluid flow through the conduit;
wherein the first cap member is configured for connection to a portion of the valve member.

It is also provided an injection valve, comprising:
a housing having an inlet port and an outlet port for fluid flow;
a base member arranged in the housing between the inlet port and the outlet port, and having a through-going conduit;
a valve member configured to move in the housing and comprising a sealing element configured to releasably mate with a valve seat, to prevent fluid flow through the conduit;
characterized by:
a first bellows connected to the valve member and to the housing and a second bellows connected to the housing and to a movable cap member and thus forming respective first and second bellows cavities;

an orifice arranged to fluidly interconnect the first and second bellows cavities; and a bellows-internal valve device arranged to selectively open and close the orifice.

In one embodiment, the first bellows and the second bellows are connected to respective first and second sides of a support member which is connected to the housing. The orifice may be formed in the support member.

In one embodiment, wherein the movable cap member and at least a portion of the housing form a sealable chamber.

In one embodiment the bellows-internal valve device comprises first and second valve sealing elements arranged to selectively mate with respective first and second valve seats to close the orifice. The bellows-internal valve device comprises in one embodiment first and second resilient members, such as coil springs, arranged on respective first and second sides of the support member and having respective portions being coupled to respective first and second holding members on the valve device.

The first bellows may be connected to a valve disc which is coupled to a stem of the valve member.

The valve disc and the cap member are movably arranged in the housing and each comprise a gasket means for sealingly and movable contact with the housing inner wall.

The invented injection valve is useful as a gas lift valve in hydrocarbon-producing operations in subterranean formations.

BRIEF DESCRIPTION OF THE DRAWINGS

These and other characteristics of the invention will become clear from the following description of a preferential form of embodiment, given as a non-restrictive example, with reference to the attached schematic drawings, which are not to scale, wherein.

DETAILED DESCRIPTION OF A PREFERENTIAL EMBODIMENT

Figure 1:
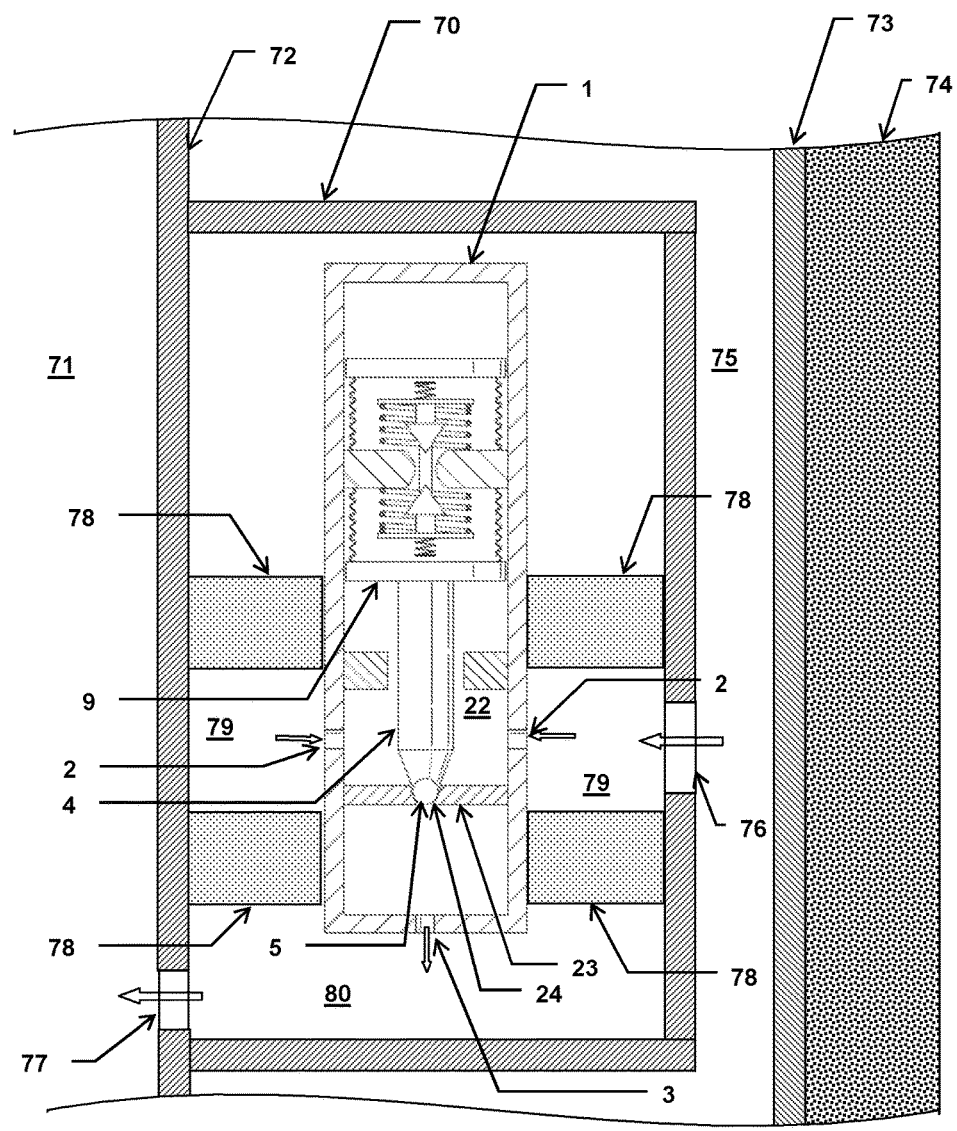
FIG. 1 is a longitudinal cross-sectional drawing of a gas lift valve with an embodiment of the double bellows according to the present invention, installed in a side pocket mandrel in a production tubing.

The following description may use terms such as "horizontal", "vertical", "lateral", "back and forth", "up and down", "upper", "lower", "inner", "outer", "forward", "rear", etc. These terms generally refer to the views and orientations as shown in the drawings and that are associated with a normal use of the invention. The terms are used for the reader's convenience only and shall not be limiting.

FIG. 1 illustrates a gas lift valve having a main housing 1, installed in a side pocket mandrel 70. The side pocket mandrel is connected to (or a part of) the outside of a production tubing 71 having a wall 72. The production tubing is positioned inside a casing having a wall 73 towards a subterranean formation 74, whereby an annulus 75 is formed between the casing wall 73 and the production tubing wall 72. These components, their configuration and use, are well known to the skilled person and amply illustrated in the prior art, and need therefore not be described further here. It should be noted that although the figures show the side pocket mandrel and gas lift valve installed in a vertical orientation, this may not always be the case. Other orientations are possible and indeed common.

The side pocket mandrel 70 comprises a mandrel inlet port 76 facing the annulus 75, and a mandrel outlet port 77 is provided in the production tubing wall 72. Gas lift valve inlet ports 2 are in fluid communication with the mandrel inlet port 76 and gas lift valve outlet port 3 is in fluid communication with the mandrel outlet port 77. Packing seals 78 isolate the inlet ports 2, 76 from the outlet ports 3, 77 in a manner which is well known in the art, defining an inlet flow conduit 79 and an outlet flow conduit 80. In operation, fluids flow into side pocket mandrel through the mandrel inlet port 76, through the gas lift valve inlet ports 2 and into a valve chamber 22, where they exert a pressure on the valve, notably the valve disc 9. If the pressure in the fluids exceed a predetermined opening pressure for the gas lift valve, the valve member (i.e. valve disc 9, valve stem 4 and valve sealing member 5) will move axially (upwards in FIG. 1), whereby the valve sealing member 5 is lifted out of its valve seat 6 (see also FIG. 2) in the valve base member 23 and the fluids may flow through the base member orifice 24, out through the valve outlet port 3 and into the outlet flow conduit 80, through the mandrel outlet port 77 and into the production tubing 71. FIG. 1 shows the gas lift valve in the closed position.

The above mentioned predetermined opening pressure for the gas lift valve, i.e. the pressure at which the valve sealing member 5 moves out of and into its valve seat, is determined i.a. by the properties and characteristics of the bellows to which the valve disc 9 is connected. This will be described in more detail in the following, with reference to FIGS. 2 and 3.

Figure 2:
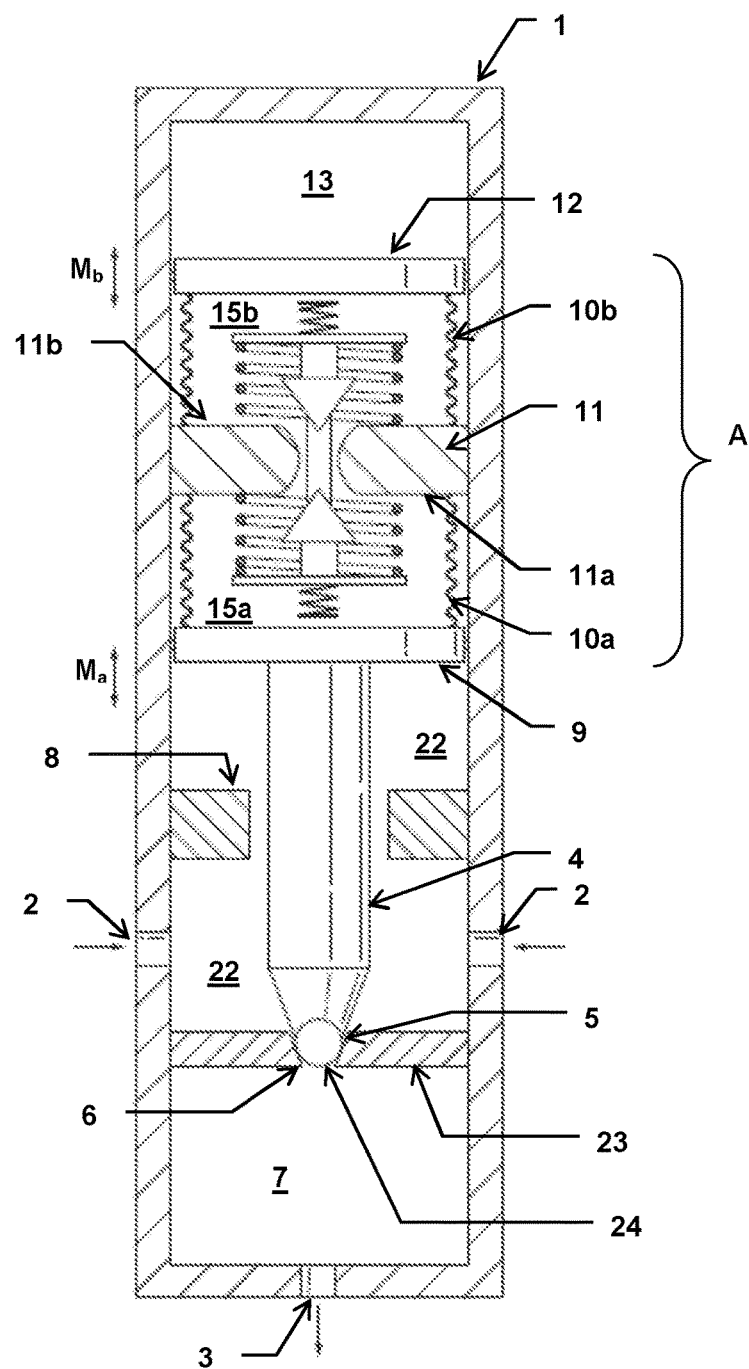
FIG. 2 is a longitudinal cross-sectional drawing of the gas lift valve illustrated in FIG. 1.

As described above, the illustrated gas lift valve comprises a housing 1 having a number of inlet ports 2 and an outlet port 3. It should be understood that the housing 1 in the illustrated embodiment has a cylindrical shape, which is a conventional shape for gas lift valves, but the invention shall not be limited to such shapes. A valve member (comprising a valve disk 9, a valve stem 4 and a sealing member 5), is arranged to move axially (i.e. up and down in FIG. 2, as indicated by the double arrow Ma) inside the housing 1. The movable valve disc 9 is furnished with a gasket against the housing wall 25 (see FIG. 3) of a type that per se is known in the art. FIG. 2 shows the valve in the closed position, with the sealing member 5 seated in the valve seat 6 in the base member 23. This sealing arrangement is well known in the art and need therefore not be described in further detail here. A valve stem guide 8—which is only indicated schematically in FIG. 2—is also connected to the housing 1 and arranged between the valve disc 9 and the base member 23. The gap between the valve stem guide 8 and the valve stem 4 has been exaggerated for the purposes of illustration.

The base member 23, which is fixedly connected to the housing 1, separates the valve chamber 22 from the outlet chamber 7. The valve inlet ports 2 are in fluid communication with the valve chamber 22 and the valve outlet port 3 is in fluid communication with the outlet chamber 7. As explained above, when the valve sealing member 5 is lifted out of its valve seat 6 in the base member 23, fluids may flow through the base member orifice 24 which provides fluid communication between the valve chamber 22 and the outlet chamber 7.

Figure 3:
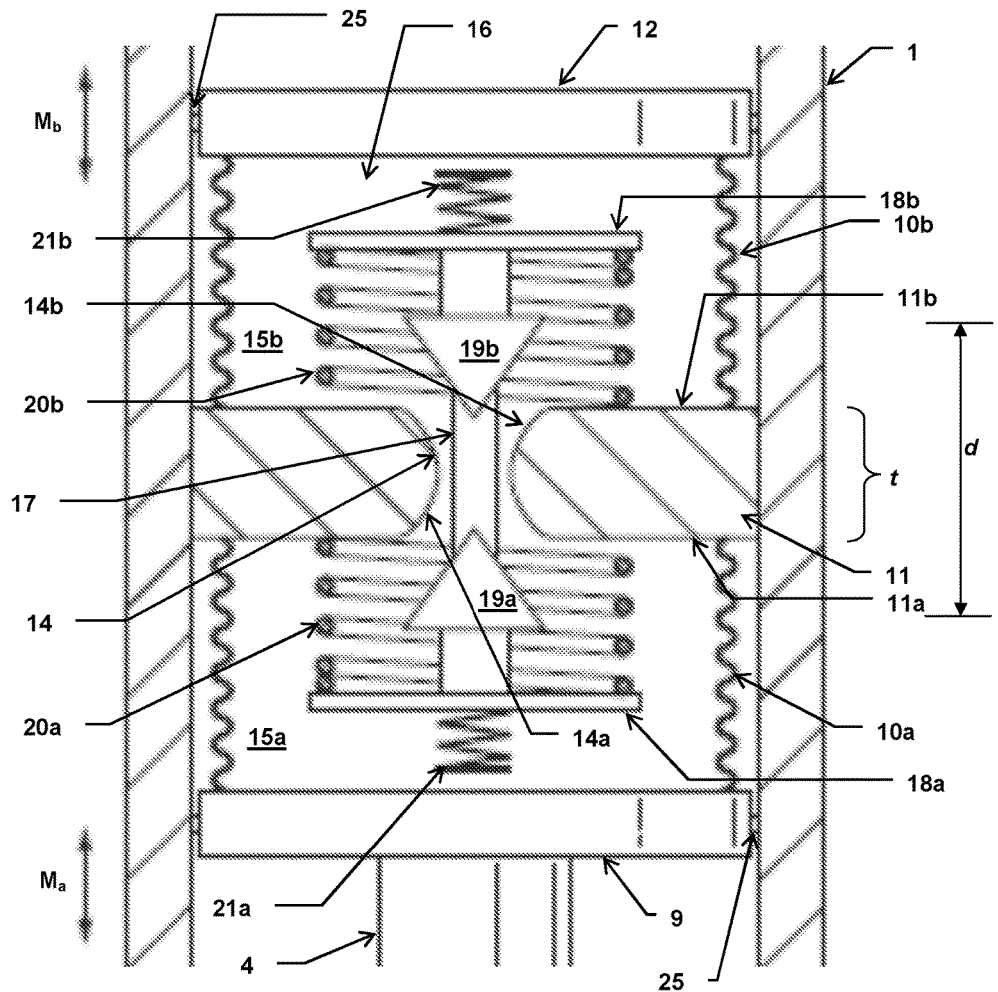
FIG. 3 is an enlargement of the section identified as "A" in FIG. 2.

A support member 11 is fixedly connected to the housing 1, above the valve disc 9, as shown in FIGS. 2 and 3. The support member 11 may advantageously be disc-shaped or cylinder-shaped, but other shapes may also be applicable. The support member 11 may be fixed to the housing inner wall in a way which is known in the art. The support member 11 comprises a through-going orifice 14, thereby providing fluid communication between the first and second support member sides 11a,b. The orifice openings on both sides are preferably chamfered or rounded, as shown in the figures, thereby providing respective first and second valve seats 14a,b.

Arranged in the orifice 14 is a valve device stem 17 which is furnished with first and second valve sealing elements 19a,b, one on each side of the support member 11. In the illustrated embodiment, the valve sealing elements are cone-shaped members, but it should be understood that other shapes are possible.

The valve sealing elements 19a,b are positioned a suitable distance apart; such that the distance d (i.e. between the regions at which the sealing elements abut against their respective seats) is greater than the housing-axial dimension (i.e. thickness) t of the support member 11 (see FIG. 3). The difference between this distance and the thickness (i.e. d−t) defines the amount of play for the valve device stem 17. In FIGS. 2 and 3, the valve device stem 17 is in its equilibrium position, such that the orifice 14 is open.

Arranged at each end of the valve device stem 17 are first and second holding elements 18a,b, in the illustrated embodiment configured as plate members. The holding elements 18a,b are fixedly connected to the valve device stem 17 by known means, for example by means of a threaded connection (not shown).

Arranged between the support member 11 and each holding element 18a,b are respective first and second coil springs 20a,b. The coil springs 20a,b serve as compressible biasing elements and are assembled between the each respective holding element and the support member with a suitable compression. It should be understood that this pre-set compression, as well as the spring stiffness, is determined to suit the design criteria for the gas lift valve as such. Also, other biasing means may be used instead of coil springs.

Movement of the valve device stem 17 will compress one of the coil springs and relax the other. For example, when the first sealing element 19a is in the seated position as shown in FIG. 3, the first coil spring 20a is generally compressed while the second coil spring is generally relaxed. The elastic properties of the coil springs 20a,b may be similar or may differ from each other, depending on the desired design characteristics.

A first bellows 10a encircles the first coil spring 20a and its holding element 18a, and is sealingly attached at one end to the movable valve disc 9 and at the other end to the first side 11a of the support member 11. A first bellows cavity 15a is thus formed between the first bellows 10a, the movable valve disc 9 and the support member first side 11a.

A second bellows 10b encircles the second coil spring 20b and its holding element 18b, and is sealingly attached at one end to a movable cap disc 12 and at the other end to the second side 11b of the support member 11. A second bellows cavity 15b is thus formed between the second bellows 10b, the movable cap disc 12 and the support member second side 11b. The movable cap disc 12 is furnished with a gasket 25 of a type that per se is known in the art and is arranged to move axially (i.e. up and down in FIGS. 2 and 3, as indicated by the double arrow Mb).

The first and second bellows 10a,b are in the application described in the illustrated embodiment, metal bellows; made by welding individual metal diaphragms to each other in a manner which is known in the art. Preferred materials are titanium, stainless steel or other high-strength, corrosion resistant, material, but the invention shall not be limited to such materials.

In use, the first and second bellows cavities 15a,b are filled with a fluid, preferably an incompressible fluid (typically silicone based oil), and are fluidly interconnected via the orifice 14. Fluid flow between the two bellows cavities is thus controlled by the position of the valve device stem 17 and its valve sealing elements 19a,b.

Arranged on each holding element 18a,b are actuator springs 21a,b, that serve as resilient abutment members between each holding element and the valve disc 9 and the cap disc 12, respectively. The stiffness of the actuator springs 21a,b may be dimensioned to suit the required application, individually or in concert with the respective coil springs 20a,b. For example, it may be desirable to dimension the actuator springs with a certain resilience such that they provide a smooth transfer of motion between the valve disc and its corresponding holding element, and vice versa. However, the actuator springs 21a,b are optional, inasmuch as they may be replaced by a solid object (e.g. a spring with very high stiffness). Also, the actuator springs may be omitted altogether, in which case the valve disc and disc cap will experience a longer stroke distance before they abut against their respective holding element. The actuator springs, with an appropriate stiffness, are preferred, however, as they provide a smooth transfer of motion, as described above. It should also be noted that the actuator spring may also be mounted on the valve disc and disc cap, instead of on the holding elements as illustrated.

The valve device stem 17, holding elements 18a,b, sealing elements 19a,b and actuator springs 21a,b (optional) are generally termed a valve device 16.

The cap disc 12 defines, together with an upper (see FIG. 2) portion of the housing a sealed chamber 13. In operation of the gas lift valve, this sealed chamber 13 is filled with a gas (such as nitrogen; the filling cap is not shown). Alternatively, the sealed chamber 13 may have a spring member (not shown) configured to provide a desired force against the cap disc 12. Such pre-charge chambers are known in the art.

In operation, when fluids enter the valve chamber 22 (through the gas lift valve inlet ports 2), they exert a pressure on the valve stem 4 and the valve disc 9. This pressure will tend to move the valve disc 9 (upwards, in FIGS. 2 and 3) and hence exert a compressive force on the first bellows 10a. This will in turn reduce the volume of the first bellows cavity 15a, whereby the fluid inside this cavity will be forced through the orifice 14 (if it is not closed) and into the second bellows cavity 15b. The second bellows cavity 15b will thus expand, in that the second bellows 10b is extended and the cap disc 12 is forced (upwards, in FIGS. 2 and 3). The movement of the cap disc 12 is counteracted by the pre-charge pressure in the sealed chamber 13.

Figure 4:
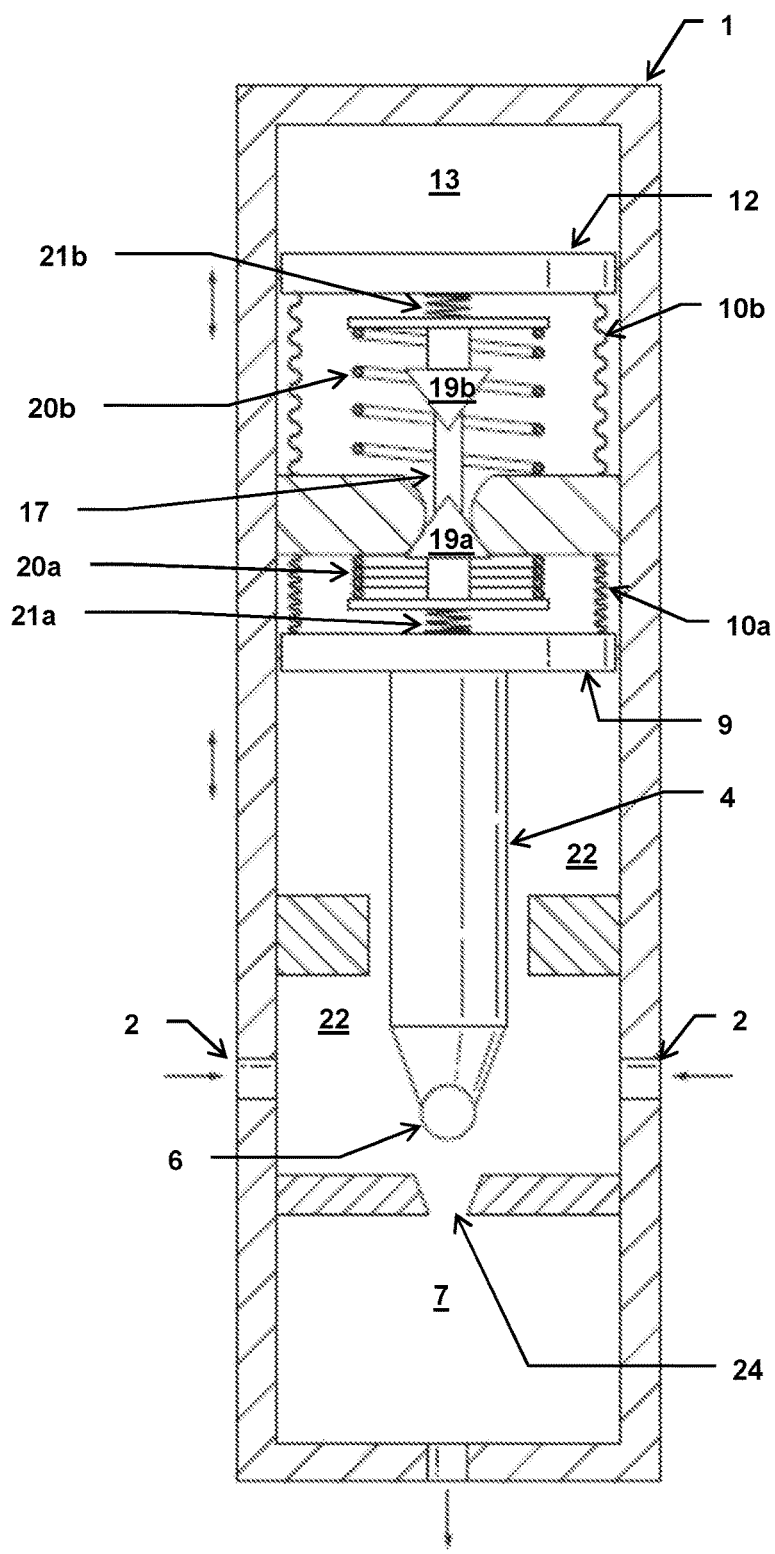
FIG. 4 is a longitudinal cross-sectional drawing of the gas lift valve illustrated in FIGS. 1 and 2, in an open position.

The movement of the valve disc 9 will also abut against the first holding element 18a (in the illustrated embodiment, via the first actuator spring 21a) and thus force the valve device stem 17 upwards (in the figures) until the first sealing element 19a is seated in the first valve seal 14a, thus obstructing fluid flow though the orifice 14. This position is shown in FIG. 4. This movement of the valve device stem 17 is counteracted by the stiffness of the first spring 20a. It should also be understood that the degree of compression of the first actuator spring 21a before the holding element starts to move, depends on the stiffness of this actuator spring.

If the pressure in the fluids flowing into the valve chamber 22 is sufficient to move the valve disc 9, the valve sealing member 5 is lifted out of the valve seat 6 and the fluid is allowed to flow through the base member orifice 24 and out of the gas lift valve through the outlet port 3.

In FIG. 4, the valve device stem 17 is in its extreme up position, such that the first valve sealing element 19a is seated in the first valve seat 14a. The first bellows 10a and first spring 20a are compressed, and the second bellows 10 is extended upwards, in use partly by the incompressible fluid that has flowed through the orifice, and partly by the second actuation spring 21b. It should be understood that the contribution by the fluid and by the second holding element/second actuation spring on the movement of the cap disc 12 (and hence the second bellows 10b) is a matter of dimensioning, of e.g. spring constants, stem length and pre-charge pressure (in chamber 13).

Although not illustrated, it should be understood that the valve device stem 17 may assume any position within the orifice 14, ranging between the position shown in FIG. 4 and the position where the second valve sealing element 19b is seated in the second valve seat 14b (i.e. the extreme down position). In these extreme positions, fluid flow through the orifice 14 is blocked by the first and second valve sealing elements 19a,b, respectively. In any intermediate position, fluid flow through the orifice 14 is possible.

The sensitivity of this bellows valve may be set for the desired application by selecting appropriate values for e.g. axial length of bellows 10a,b, thickness of support member 11 (i.e. length of orifice 14), stiffness of springs 20a,b, distance between valve sealing elements 19a,b and/or pre-charge pressure in the sealed chamber 13.

It should be understood that the valve housing 1, although being shown as one body in FIGS. 1 and 2, in fact may be comprised of several housing sections that are connected (e.g. via threaded connections) in manners well known in the art. Such sectional configuration facilitates an easy assembly and dismantling of internal components (e.g. the support member 11, valve disc and stem 9, 4 and the individual bellows components). It should also be understood that the support member 11, valve stem guide 8 and valve base member 23 may be fixedly attached to the housing interior by any fastening means known in the art.

Although the invention has been described with reference to a gas lift valve for use in a production tubing in a subterranean formation, it should be understood that the invention is not limited to use. The invented valve may be used in onshore or offshore applications, and in other valves (e.g. injection valves) and in other contexts that that of hydrocarbon production. Likewise, the invented bellows valve shall not be limited to the use described above, i.e. in a gas lift valve, but may be used in any context and in combination with any equipment as a pressure-sensitive bellows valve.

The invention claimed is:

1. A bellows valve, comprising:
    a first bellows connected to a first cap member at one end and to a support member at the other end; and
    a second bellows connected to a second cap member at one end and to said support member at the other end;
    first and second bellows cavities formed inside each of the first and second bellows, respectively;
    an orifice arranged to fluidly interconnect the first and second bellows cavities; and
    a bellows-internal valve device arranged to selectively open and close the orifice,
    wherein the bellows-internal valve device comprises first and second valve sealing elements arranged to selectively mate with respective first and second valve seats to close the orifice, and the valve sealing elements are interconnected via a connecting member.

2. The bellows valve of claim 1, wherein the first bellows is connected to a first side of the support member, and the second bellows is connected to a second side of the support member.

3. The bellows valve of claim 1, wherein the support member is configured for connection to an internal portion of a valve housing.

4. The bellows valve of claim 1, wherein the orifice is formed in the support member.

5. The bellows valve of claim 1, wherein the connecting member extends through the orifice.

6. The bellows valve of claim 1, wherein the bellows-internal valve device comprises first and second resilient members arranged on respective first and second sides of the support member and having respective portions being coupled to respective first and second holding members on the valve device.

7. The bellows valve of claim 1, wherein the first cap member is disc-shaped and configured for connection to a valve stem.

8. The bellows valve of claim 1, wherein the first and second cap members each comprise a circumferential gasket.

9. A method comprising the step of:
    using the bellows valve of claim 1, in an injection valve having:
    a housing with an inlet port and an outlet port for fluid flow;
    a base member arranged in the housing between the inlet port and the outlet port, and having a through-going conduit; and
    a valve member configured to move in the housing and comprising a sealing element configured to releasably mate with a valve seat, to prevent fluid flow through the conduit,
    wherein the first cap member is configured for connection to a portion of the valve member.

10. An injection valve, comprising:
    a housing having an inlet port and an outlet port for fluid flow;
    a base member arranged in the housing between the inlet port and the outlet port, and having a through-going conduit;
    a valve member configured to move in the housing and comprising a sealing element configured to releasably mate with a valve seat, to prevent fluid flow through the conduit;
    a first bellows connected to the valve member and to the housing and a second bellows connected to the housing and to a movable cap member and forming respective first and second bellows cavities;
    an orifice arranged to fluidly interconnect the first and second bellows cavities; and
    a bellows-internal valve device arranged to selectively open and close the orifice,
    wherein the first bellows is connected to a valve disc coupled to the stem of the valve member, and wherein the valve disc and the cap member are movably arranged in the housing and each comprise a gasket for sealing and movable contact with the housing inner wall.

11. The injection valve of claim 10, wherein the first bellows and the second bellows are connected to respective first and second sides of a support member connected to the housing.

12. The injection valve of claim 11, wherein the orifice is formed in the support member.

13. The injection valve of claim 11, wherein the bellows-internal valve device comprises first and second resilient members arranged on respective first and second sides of the support member and having respective portions being coupled to respective first and second holding members on the valve device.

14. The injection valve of claim 10, wherein the movable cap member and at least a portion of the housing form a sealable chamber.

15. The injection valve of claim 10, wherein the bellows-internal valve device comprises first and second valve sealing elements arranged to selectively mate with respective first and second valve seats to close the orifice.

16. A method comprising the step of:
using the injection valve of claim 10, as a gas lift valve in hydrocarbon-producing operations in subterranean formations.

* * * * *